United States Patent [19]

Lee et al.

[11] Patent Number: 4,600,765

[45] Date of Patent: Jul. 15, 1986

[54] MELT PROCESSABLE OPTICALLY ANISOTROPIC POLYMERS

[75] Inventors: David M. Lee; David A. Hutchings, both of Newark; Gloria M. Sieloff, Pataskala; G. Fred Willard, Newark, all of Ohio

[73] Assignee: Owens-Corning Fiberglas Corporation, Toledo, Ohio

[21] Appl. No.: 581,166

[22] Filed: Feb. 17, 1984

[51] Int. Cl.$^4$ ............................................. C08G 63/18
[52] U.S. Cl. ..................................... 528/193; 528/176; 528/190; 528/191; 528/194; 528/271; 568/716
[58] Field of Search ............... 528/176, 190, 191, 193, 528/194, 271

[56] References Cited

U.S. PATENT DOCUMENTS

| | | | |
|---|---|---|---|
| 3,991,013 | 11/1976 | Pletcher | 528/193 |
| 4,083,829 | 4/1978 | Calundann et al. | 528/193 |
| 4,159,365 | 6/1979 | Payet | 428/364 |
| 4,238,600 | 12/1980 | Jackson, Jr. et al. | 528/190 |
| 4,242,496 | 12/1980 | Jackson, Jr. et al. | 528/176 |
| 4,284,757 | 8/1981 | Fayolle | 528/191 |
| 4,311,824 | 1/1982 | Fayolle | 528/193 |
| 4,360,658 | 11/1982 | Jackson, Jr. et al. | 528/193 |
| 4,447,593 | 5/1984 | Funakoshi et al. | 528/193 |

Primary Examiner—Lester L. Lee
Attorney, Agent, or Firm—Ronald C. Hudgens; Robert F. Rywalski

[57] ABSTRACT

Melt spinnable, liquid crystal aromatic polyesters which are optically anisotropic in the melt phase are provided.

9 Claims, No Drawings

MELT PROCESSABLE OPTICALLY ANISOTROPIC POLYMERS

TECHNICAL FIELD

The present invention relates to linear polyesters, and, more particularly, it relates to melt processable optically anisotropic liquid crystal polyesters.

BACKGROUND AND SUMMARY

Liquid crystal polyesters, or those which exhibit optical anisotropy in the melt phase, are well known in the art. Numerous patents describe such polyesters and some are, for example, generally described in the article by W. J. Jackson, Jr. appearing in the *British Polymer Journal* December 1980 entitled, "Liquid Crystal Polymers IV Liquid Crystalline Aromatic Polyesters".

Some aromatic polyesters exhibit optical anisotropy in the molten state and can be melt spun into crystalline fibers which upon subsequent heat treatment further crystallize and substantially increase in tenacity. Such heat treated polyester fibers can be used for numerous purposes such as, for example, in tire cords and in other industrial and consumer products where high strength and low weight with its attendant economic and other advantages are desired. Specific applications for such type liquid crystal polyesters are as high strength reinforcements for numerous thermoplastic and thermosetting polymer materials.

In addition to their use in the form of fibers, such polyesters can also be formed by molding, for example, injection molding, into a wide variety of substrates which will have outstanding stiffness and toughness and strength.

In accordance with the present invention, an improved low cost, high performance thermotropic polyester, which is optically anisotropic in the melt, is manufactured and formed into fibers or molded into other useful articles using conventional thermoplastic polymer processing and forming technology.

The melt spinnable, liquid crystal polymers contemplated herein are of fiber forming molecular weight and exhibit optical anisotropy in the liquid phase and comprise recurring moieties.

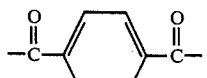

I.

and

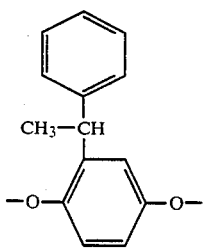

II.

and, optionally, either or both of moieties III and/or IV wherein

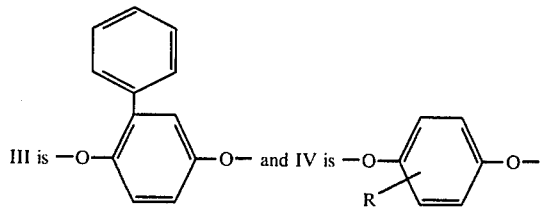

wherein R is an alkyl of 1–5 carbon atoms, e.g. methyl or tertiary butyl. Preferably the polymer consists essentially of moieties I, II and III and, most preferably, with the mole ratio of III to II being about 1.

DESCRIPTION AND INDUSTRIAL EXPLOITATION

The polymers contemplated herein, that is, those having moieties I, and II and optionally either or both of III and IV described above, are formed by reacting polyester forming precursors of said moieties under polyester forming reaction conditions. Thus, they may be formed by solution polymerization, which is a preferred technique, as well as by melt or emulsion polymerization. They may be formed from the diacids, diacid halides, diols or esters by transesterification. In the preferred mode of practicing the invention, the polymers will be synthesized by solution polymerization techniques in which the precursor for moiety I is terephthaloyl chloride. The preferred precursor for moiety II is (1-phenylethyl)hydroquinone, and the preferred precursor for moiety III is phenylhydroquinone and the preferred precursor for moiety IV is a $C_1$–$C_5$ alkyl substituted hydroquinone.

Upon synthesizing and recovering the polymer, the polymer may be formed into usefully shaped articles, as indicated above, by conventional techniques. Thus, for example, the polymer can be extruded and formed into pellets to provide a densified product which product may then be fed to another extruder and formed into various articles such as fibers by use of a spinneret or any suitable die to form films or sheets. In addition, the material may be injection molded into various configurations using conventional injection molding techniques. When formed into fibers, it is desirable to subject the fiber package to a heat treatment. This may be accomplished by simply heating the fiber package, with the fibers being in a relaxed condition, in an inert atmosphere, such as, for example, a flow of nitrogen, to a sufficient temperature and for a sufficient period of time to increase the tenacity significantly. That is, increase the tenacity on the order of at least about 50%. Such a heat treatment is also desirable for other objects, e.g., sheets, films and molded articles.

The specific reactants employed will be routinely selected by those skilled in the art, and it will be readily apparent to them that polymer grade reactants should be employed. Additionally, for most outstanding results, it is desirable that stoichiometric amounts of the reactants be employed. In passing, it should be mentioned that generally the mole ratio of moiety II to moiety III and/or moiety IV may vary over a wide range. For example, in the preferred terpolyester of moieties I, II and III, the ratio of moiety II to moiety III suitably will be about 1:4 to about 4:1, desirably about 2:1 to about 1:2 and, for most preferred results, will be approximately equimolar amounts.

As previously indicated, moiety II is preferably incorporated into the thermotropic polyester by employing (1-phenylethyl)hydroquinone as the monomer. Additionally, as indicated, such moiety may be incorporated into the polyester by using an ester derivative thereof. Such ester derivatives will be routinely manufactured by those skilled in the art employing (1-phenylethyl)hydroquinone as a starting material. An outstanding technique for synthesizing (1-phenylethyl)hydroquinone is to react styrene with hydroquinone in the presence of an organic diluent, preferably an ether, and in the presence of effective reaction simulating amounts of a Lewis acid. The reaction is preferably conducted at approximately 135° C. to about 145° C., and the crude product is purified by high vacuum batch distillation. In the preferred technique, the diluent will be tetraethyleneglycol dimethylether, that is, a material of the formula $CH_3-(OCH_2CH_2)_4OCH_3$ which is commercially available under the trade designation Tetraglyme material. The preferred Lewis acid is para-toluene sulfonic acid, and, in this case, it is preferred to purify the crude (1-phenylethyl)hydroquinone product by distillation employing sodium hydrogen sulfite to neutralize the para-toluene sulfonic acid catalyst.

The preferred technique, alluded to above, for synthesizing the novel, melt processable, liquid crystal aromatic polyesters of the present invention is a solution polymerization technique, and, as also indicated above, it is preferred that the reactants be terephthaloyl chloride, (1-phenylethyl)hydroquinone and optionally either or both of phenylhydroquinone and and/or alkyl substituted hydroquinone. Obviously, such reaction will be conducted in the presence of a hydrochloric acid trap. Suitable hydrochloric acid traps, or scavengers, are the organic bases, for example, aliphatic and aromatic amines, especially tertiary amines. The preferred trap is pyridine, and it is preferred to employ an excess, for example, up to about 50 percent molar excess of such material. The solvents employed for the solution polymerization will be routinely selected by those skilled in the art, but it is generally preferred to employ the low molecular weight chlorinated hydrocarbons, such as, for example, the fully or partially chlorinated $C_1-C_3$ alkanes like trichloromethane, trichloroethane with dichloromethane being preferred.

While the above describes the present invention with sufficient particularity to enable those skilled in the art to make and use same, nonetheless, a method of industrially exploiting the present invention follows.

PREPARATION OF (1-PHENYLETHYL)HYDROQUINONE

Into a 50 liter three-necked round-bottom flask, there is charged 5 Kg (45.4 moles) of hydroquinone (Technical Grade Hydroquinone available from Eastman Chemical Products, Inc.). Additionally, there is charged 10 liters of Tetraglyme material and 60 grams (0.32 moles) of para-toluene sulfonic acid monohydrate. A mechanical stirrer with a ground glass shaft is employed, and, while stirring slowly, the reagent mixture is warmed to about 140° C. While maintaining that temperature, 4.166 Kg (40 moles) of styrene is added over approximately a 90-minute period. During the addition of the styrene, a slight exothermic reaction sets in, and the temperature is maintained at approximately 140° C. plus or minus about 5° C. After the styrene addition is finished, the reaction mixture is held at that temperature for approximately 5 hours after which time the heating and stirring is turned off and the mixture allowed to cool overnight. The crude product has the appearance of a heavy motor oil both in relative viscosity and color, and it is homogeneous and free of suspended solids. The yield is about 19.316 Kg.

The crude product is purified by high vacuum batch distillation employing a 12 liter flask reboiler with agitator and vacuum, a 4 ft.×2" column packed with about 30" of crimped wire mesh packing, a cooled refluxed condenser, a heat traced reflux splitter, receiver and associated piping. In a typical distillation, approximately 10 Kg of crude product is charged employing about 31 grams of sodium hydrogen sulfite to neutralize the para-toluene sulfonic acid catalyst. Distillation breakdown with one distillation is set forth in Table I. One redistillation of all the best fractions (fractions 4 & 5) easily yields a 96% plus pure (1-phenylethyl)hydroquinone product.

TABLE I (1-Phenylethyl)hydroquinone Distillation
Charge Weight 10,000 grams

| Frac-<br>tion # | Weight<br>Grams | Tempera-<br>ture °C.<br>RFX/<br>REB @ P | % Sty-<br>rene | % HQ/<br>TG | % PEHQ | % DPEHQ |
|---|---|---|---|---|---|---|
| 1 | 150 | 122°/162°<br>@ 3 mm | 20 | 80 | — | — |
| 2 | 3030 | 130°/163°<br>@ 2 mm | <2 | 95 | <2 | — |
| 3 | 2225 | 124°/189°<br>@ .4 mm | — | 95 | <3 | — |
| 4 | 925 | 174°/212°<br>@ 25 mm | — | 7 | 93 | — |
| 5 | 2103 | 198°/249°<br>@ .6 mm | — | 4 | 94 | 2 |
| 6 | 142 | 205°/265°<br>@ .7 mm | — | — | 50 | 50 |
| Residue | 1378 | — | — | — | 2 | 85 |

RFX = Reflux
REB = Reboiler
P = Pressure
HQ = Hydroquinone
TG = Tetraglyme material
PEHQ = (1-Phenylethyl)hydroquinone
DPEHQ = Di(phenylethyl)hydroquinone - probably a mixture of 2,5-DPEHQ and 2,6-DPEHQ

POLYMER PROCESSING

The polymer was synthesized employing a reactor equipped with both cooling and heating and provided with a reflux condenser. The reaction was generally conducted employing a moderate nitrogen flow blanket and substantially at atmospheric pressure.

A solution of 14.7 Kg (68.7 moles) of (1-phenylethyl)hydroquinone, and 12.8 Kg (68.7 moles) of phenylhydroquinone, 48.2 Kg of methylene chloride, and 21.7 to about 26.1 Kg of pyridine was formed in the reactor. The preferred order of addition is (1-phenylethyl)hydroquinone, pyridine, methylene chloride and phenylhydroquinone. Approximately 27.9 Kg (137.4 moles) of terephthaloyl chloride was dissolved in about 83.7 Kg of methylene chloride. The terephthaloyl chloride solution was added to the diol solution at the rate of approximately 2.7 Kg per minute for about 20 minutes and then about 5.4 Kg per minute for a remaining 10 minutes while stirring vigorously and substantially maintaining the reactor temperature at about 35° F. (about 2° C.). It is desirable not to allow the slurry to exceed about 75° F. (about 24° C.). Upon completion of the terephthaloyl chloride/methylene chloride solution addition, the reactor was held one hour with stirring at about 2° C.

There was then added 454 Kg of deionized water to the reaction mass, and the slurry temperature was raised to about 104° F. (about 41° C.) to extract the methylene chloride by distillation. After most of the methylene chloride, for example, about 85%, had been removed the slurry temperature was increased to 185° F. (85° C.) and maintained there for approximately 1 hour with further removal of methylene chloride. The hot slurry was then fed to a rotary drum filter. The residual wet cake was then re-slurried with an additional 454 Kg of water, heated to approximately 185° F. and maintained at that temperature for approximately 1 hour prior to again feeding the material to the rotary drum filter. The filtered wet cake was then again slurried using about 454 Kg of acetone with the slurry being heated to approximately 130° F. (54° C.) and holding it at that temperature for approximately 1 hour. The slurry was again filtered, and the wet cake was then combined with an additional 454 Kg of acetone followed by heating of this slurry again to approximately 130° F. and holding at that temperature for 1 hour before again separating the solids by means of a rotary drum filter. The final wet cake was dried in a vacuum oven at approximately 250° F. (121° C.) at about 20–26" (508 to 660 mm) Hg overnight.

The dried polymer typically has a melting point of about 320° C. and an inherent viscosity of about 0.6 to about 1.2 (dl per gram) at a concentration of about 0.5 (grams per 100 ml) in a solvent of equal volumes of trifluoroacetic acid and methylene chloride. This thermotropic polymer, which is optically anisotropic in the melt phase, is capable of being melt spun into fibers, extruded into films or sheets and, as previously indicated, injection molded to form numerous substrates, for example, substrates which have utility as substrates for printed circuit boards. As previously indicated, such articles will be heat treated.

In forming fibers, e.g. having a monofilament diameter of about 10 to 30 microns, the polymer is, first of all, formed into pellets by extruding the material as a rod followed by cooling and then chopping the rod into pellets of approximately 3–5 mm in size. Typical barrel temperatures in the extruder will be about 340° C. The pellets are then supplied to another conventional extruder and are formed by means of a spinneret into fibers which can be wound onto a package using conventional winding equipment. The packages are desirably formed by winding onto a metal package core. The packages, containing relaxed fibers, are then heat treated in nitrogen atmosphere at a temperature of about 302° C. for about 22 hours (and 5 hour heat-up and about 17 hour hold period). Typical properties of heat treated crystalline monofilament fibers are as follows: tenacity typically about 18 to about 20 grams per denier (calculated based on measurement of Instron break load using 12.7 mm gauge length at a rate of 5 mm per minute, and measurement of density and cross-sectional area); a tensile modulus typically of about 510 to about 750 grams per denier; and an elongation of 3–4% to break.

As previously indicated, in accordance with this invention, melt spinnable, liquid crystal polyesters of fiber forming molecular weight and which are optically anisotropic in the melt may also be formed by substituting all or a portion of moiety III with moiety IV below.

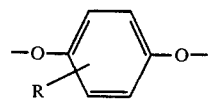

MOIETY IV

R is an alkyl of 1–5 carbon atoms including, for example, methyl and tertiary butyl. The preferred reactants, when it is desired to form a polyester containing moiety IV, will be alkyl substituted hydroquinones although, of course, other polyester forming precursors may be employed. While the proportion of moiety IV may vary when such moiety is incorporated in the polyester in lieu of moiety III above, it will generally be employed in an amount relative to moiety II of about 9:1 to about 1:9. Preferably, when using moiety IV where R is CH$_3$, the ratio of IV to II will be about 1:9 to about 2:8 or about 8:2 to about 9:1 to produce heat treatable fibers having suitable tenacities; between a ratio of about 2:8 to about 8:2, the polymers generally have melting points which are too low (e.g., less than about 300° C.) for desired effective heat treatment. When R is t-butyl, the preferred ratio of IV to II is about 3:7 to about 8:2. Such polyesters have melting points of 300° C. to about 350° C. Furthermore, while the proportions again may vary when the polyester employed includes both moiety III and moiety IV, the relative amounts of moiety IV to moiety III will suitably be about 1:4 to about 4:1. Heat treated fibers, when moiety IV is used to the exclusion of moiety III, will typically have the following properties: a tenacity of 10–15 grams per denier (same as above except rate of 2 mm per minute); a modulus of about 250–500 grams per denier; and an elongation of about 3–5%. Heat treated fibers having substantially only moieties I and II have properties generally about the same as those for the polyester with moieties I, II and IV.

While the above describes the present invention, it will, of course, be apparent that modifications are possible which, pursuant to the patent statutes and laws, do not depart from the spirit and scope thereof.

We claim:

1. A melt spinnable liquid crystal polyester which is optically anistropic in the melt phase and of fiber forming molecular weight consisting essentially of recurring moieties of formulas:

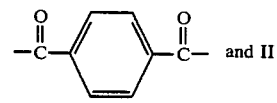 and II and moiety III or IV wherein III is

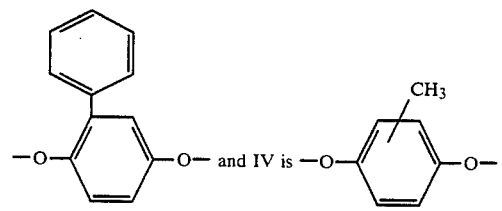

wherein the mole ratio of moiety II to moiety III, when present, is 1:4 to 2:1 and wherein the mole ratio of moiety II to moiety IV, when present, is 2:8 to 1:9.

2. The polyester of claim 1 wherein said polyester has a melting point of at least about 300° C.

3. The polyester of claim 1 wherein said polyester consists essentially of moieties I, II and III.

4. The polyester of claim 1 wherein said polyester consists essentially of moieties, I, II and IV.

5. A heat treated fiber formed of the polyester of claim 3.

6. A film formed of the polyester of claim 3.

7. A molded article formed of the polyester of claim 3.

8. The fiber of claim 5 wherein said fiber has a tenacity of at least about 18 grams per denier.

9. A fiber formed of the composition of claim 3, said fiber exhibiting an increase in tenacity of at least 100% when heated in a nitrogen atmosphere to a temperature of about 302° C. for about 22 hours.

* * * * *

UNITED STATES PATENT AND TRADEMARK OFFICE
CERTIFICATE OF CORRECTION

PATENT NO. : 4,600,765

DATED : July 15, 1987

INVENTOR(S) : Lee, et al

It is certified that error appears in the above-identified patent and that said Letters Patent is hereby corrected as shown below:

Column 3, line 12, "simulating" should be --stimulating--.
Column 3, line 31, delete the "and" before "and/or".
Column 5, line 53, delete "and" before "5 hour" and insert --about--.

Column 6, line 51, before " 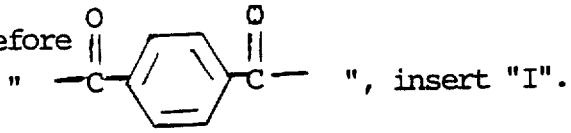 ", insert "I".

UNITED STATES PATENT AND TRADEMARK OFFICE
CERTIFICATE OF CORRECTION

PATENT NO. : 4,600,765

DATED : July 15, 1987

INVENTOR(S) : Lee, et al

It is certified that error appears in the above-identified patent and that said Letters Patent is hereby corrected as shown below:

Column 6, line 51, after "and II", insert

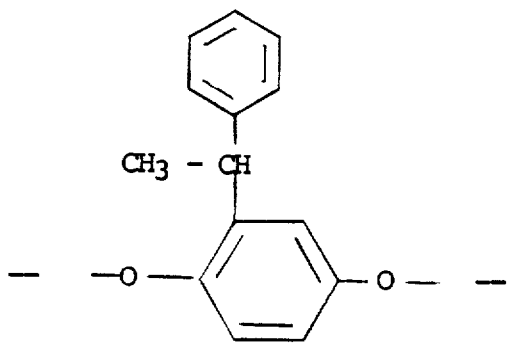

Signed and Sealed this

Fifteenth Day of December, 1987

Attest:

DONALD J. QUIGG

Attesting Officer

Commissioner of Patents and Trademarks